US008819250B2

(12) United States Patent
Albayrak et al.

(10) Patent No.: US 8,819,250 B2
(45) Date of Patent: Aug. 26, 2014

(54) METHOD FOR THE COMPUTER-AIDED DETERMINATION OF A CONTROL VARIABLE, CONTROLLER, REGULATING SYSTEM AND COMPUTER PROGRAM PRODUCT

(75) Inventors: Sahin Albayrak, Berlin (DE);
Frank-Uwe Andersen, Berlin (DE);
Changpeng Fan, Berlin (DE); Ahmet Cihat Toker, Berlin (DE); Giscard Wepiwé, Friedrichsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 627 days.

(21) Appl. No.: 12/733,618

(22) PCT Filed: Aug. 19, 2008

(86) PCT No.: PCT/EP2008/060831
§ 371 (c)(1),
(2), (4) Date: Jun. 7, 2010

(87) PCT Pub. No.: WO2009/033916
PCT Pub. Date: Mar. 19, 2009

(65) Prior Publication Data
US 2010/0256783 A1    Oct. 7, 2010

(30) Foreign Application Priority Data

Sep. 11, 2007   (EP) .................................. 07017798

(51) Int. Cl.
*G06F 15/16*     (2006.01)
*G06F 17/50*     (2006.01)
*H04L 12/24*     (2006.01)
*H04L 12/26*     (2006.01)

(52) U.S. Cl.
CPC .............. *H04L 41/147* (2013.01); *H04L 43/16* (2013.01); *H04L 43/103* (2013.01); *H04L 41/145* (2013.01); *H04L 43/0817* (2013.01)
USPC ............................................ 709/228; 703/13

(58) Field of Classification Search
USPC .......................................................... 709/228
See application file for complete search history.

(56) References Cited

U.S. PATENT DOCUMENTS 5,195,024 A  *  3/1993  Kurokawa et al. .............. 700/23
(Continued)

FOREIGN PATENT DOCUMENTS

EP           1244248 A     9/2002

OTHER PUBLICATIONS

Jia Jiao et al: Toward Efficient Monitoring, IEEE Journal on Selected Areas in Communications, IEEE Service Center, Piscataway, US, Bd. 18, Nr. 5, Mai 2000, XP011055122, ISSN: 0733-8716.
(Continued)

*Primary Examiner* — Brian P Whipple
*Assistant Examiner* — James Edwards
(74) *Attorney, Agent, or Firm* — Staas & Halsey LLP

(57) ABSTRACT

A method for the computer-aided determination of a control variable using context information from one or more units to be controlled is described. This method involves a controller using simulation to ascertain a piece of simulated context information which is used as a control variable, wherein the simulated context information comprises a first variable which represents a presumed state of the one or more units at a given time. The controller compares a received piece of context information, which comprises a second variable which represents the actual state of the unit to be controlled at a time which is before the given time, with the simulated context information and checks whether the simulated context information matches the context information within prescribed limits. In addition, the controller requests a piece of updated context information from one or more units to be controlled if the simulated context information matches the context information at the given time outside the present limits.

21 Claims, 1 Drawing Sheet

(56) References Cited

U.S. PATENT DOCUMENTS

| | | | |
|---|---|---|---|
| 5,477,444 A * | 12/1995 | Bhat et al. | 700/48 |
| 6,173,323 B1 | 1/2001 | Moghe | |
| 6,529,490 B1 * | 3/2003 | Oh et al. | 370/331 |
| 7,103,423 B2 * | 9/2006 | Ebermann et al. | 700/33 |
| 7,693,608 B2 * | 4/2010 | Nasle | 700/286 |
| 8,046,199 B2 * | 10/2011 | Copeland | 703/2 |
| 2003/0154059 A1 * | 8/2003 | Feldmann et al. | 703/2 |
| 2003/0188029 A1 * | 10/2003 | Shafran et al. | 709/249 |
| 2004/0107319 A1 * | 6/2004 | D'Orto et al. | 711/133 |
| 2006/0187858 A1 * | 8/2006 | Kenichi et al. | 370/254 |
| 2006/0256867 A1 * | 11/2006 | Turaga et al. | 375/240.16 |
| 2008/0077368 A1 * | 3/2008 | Nasle | 703/4 |
| 2008/0120080 A1 * | 5/2008 | Nasle | 703/13 |
| 2008/0221709 A1 * | 9/2008 | Ishii et al. | 700/30 |
| 2009/0063115 A1 * | 3/2009 | Lu et al. | 703/8 |
| 2010/0165947 A1 * | 7/2010 | Taniuchi et al. | 370/331 |
| 2010/0322413 A1 * | 12/2010 | Matsushima et al. | 380/28 |

OTHER PUBLICATIONS

Dilman M. et al: Efficient Reactive Monitoring, Proceedings IEEE Infocom 2001, The Conference on Computer Communications, 20th. Annual Joint Conference of the IEEE Computer and Communications Societies, Anchorage, AK, Apr. 22-26, 2001, Bd. vol. 1 of 3, Conf. 20, Apr. 22, 2001, pp. 1012-1019, XP010538789, ISBN: 0-7803-7016-3.

* cited by examiner

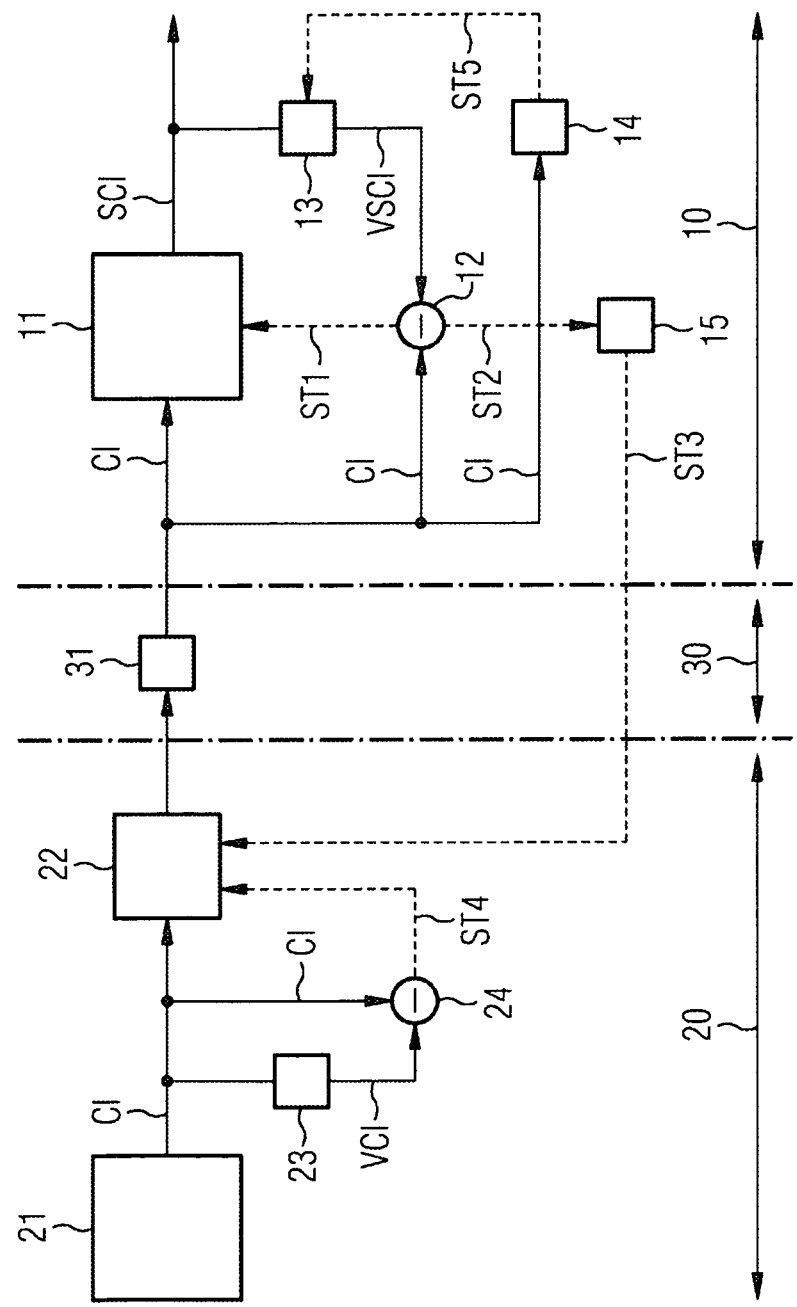

METHOD FOR THE COMPUTER-AIDED DETERMINATION OF A CONTROL VARIABLE, CONTROLLER, REGULATING SYSTEM AND COMPUTER PROGRAM PRODUCT

REFERENCE TO RELATED APPLICATIONS

This application is based on and hereby claims priority to PCT Application No. PCT/EP2008/060831 filed on Aug. 19, 2008 and EP Application No. EP07017798 filed on Sep. 11, 2007, the contents of which are hereby incorporated by reference.

BACKGROUND

The invention relates to a method for the computer-assisted determination of a control variable using context information from one or more units to be controlled and to a controller embodied for implementing the method.

A problem is described below with the aid of communication networks. This only takes place for the purpose of illustration and is however not to be considered as restrictive.

In communication networks, context information is used increasingly for controlling the communication network. Context information represents any information which was generated by any unit in the communication network (e.g. terminal, an access computer, a switching computer etc.) in conjunction with an event. A unit, which generates context information and makes other components of the communication network available, is also referred to as a context source or source. The use of context information enables the state or status of a network element, also known as unit, to be determined without the explicit exchange of signaling messages across the communication network for instance. As a result, the number of messages, which usually have to be exchanged in conjunction with the controller of the communication network, can be reduced. The result is therefore a stronger scalable architecture of the communication network. Furthermore, the purpose of network activities can be derived from context information, as a result of which the controller of the communication network can take place proactively. As a result, problems can be dealt with before they actually occur for instance.

The control of a communication network using context information is essentially associated with two disadvantages:

1. There is a delay between the source of the context and a unit of the communication network processing the context information. This is usually caused by the transmission of context information from the source to the processing unit of the communication network. This means that the unit processing the context information contains the information contained in the context information relating to the source and the transmitted components with content which is not current. In the meantime, this is hugely disadvantageous for conventional, highly dynamic communication networks.

2. In a communication network, the bandwidth available for the transmission of data is a resource to be used carefully. This relates in particular to communication networks, which wirelessly transmit the data. There is essentially the need to use the available bandwidth as far as possible for the user data and not for the control data. Context information provided by a source, which is used for the controller and the management of the communication network, falls within the category of control information. As a result of this, the transmission of context information in a communication network is to be minimal in order to ensure an efficient use of the bandwidth.

SUMMARY

To be able to use context information, this is collected from a central unit of the communication network, with the context information being transmitted from the source to this unit via the communication network. To obtain precise information relating to the behavior of the source and the units of the communication network transmitting the context information, a corresponding frequency of the transmission of context information has to be ensured. As a result of the aforecited problem and in order to reduce the frequency of the context information transmission, a switch was made to perform an estimation of context information, which relates to actual context information from the past. The history of the context information from the past is herewith considered.

It is one potential object to determine an alternative method for the computer-assisted determination of a control variable using context information from one or more units to be controlled, which get by with a minimal amount of context information. It is also a potential object to specify a controller, which enables the implementation of the proposed method. A further potential object relates to specifying a regulating system, which enables the computer-assisted determination of a control variable using context information from one or more units to be controlled. A computer program product is also to be specified.

The inventors propose a method for the computer-assisted determination of a control variable using context information from one or more units to be controlled, a controller determines a simulated item of context information, by simulation, which is used as a control variable, with the simulated context information including a first variable which represents an assumed state of one or more units at a given point in time. The controller compares an item of received context information, which includes a second variable, which represents the actual state of the unit to be controlled at a point in time, which is before the given point in time, with the simulated context information. A check is carried out here to determine whether the simulated context information corresponds to the context information within predetermined limits. The controller requests an updated item of context information from the one or more units to be controlled if the simulated context information outside the present limits corresponds with the context information at a given point in time.

The proposed method therefore enables the number of items of context information transmitted between the one or more units to be controlled and the controller to be reduced. To this end, the controller assumes the state in which the controlled units must be and compares this assumption with the context information actually arriving from the one or more units to be controlled. If the expected values deviate from the received context information, the demand rate is increased.

In a further embodiment, the controller does not request updated context information from the one or more units to be controlled if the simulated context information within the existing limits agrees with the context information at the given point in time. If the expected values deviate from the received context information, the demand rate is reduced.

In a further embodiment, the received context information is processed as an input variable in order to determine the simulated context information. The simulation herewith represents a model of the unit or units supplying the context information, possibly taking into account the components involved in the transmission to the controller. The model herewith attempts to reproduce the behavior of the unit or units in the same way, as it behaves in practice. The controller for simulating the simulated context information is therefore supplied with an item of context information, which represents the state of the units sending the same in the past. This is taken into consideration by the model of the simulation so that the simulated context information corresponds to a current state of the unit.

As a result of the time delay between sending the context information and supplying the context information to the controller, it is expedient if the simulated context information is temporally delayed for the comparison with the context information. As a result, the time delay for the transmission of the context information can be taken into account. The delay is expediently variably adjusted as a function of a determined or estimated time delay from sending the context information to receiving the context information at the controller.

In a further embodiment, the simulated and temporally delayed context information is compared with the context information present on the controller at the current point in time.

The controller not only expediently determines whether the simulated or simulated and temporally delayed context information deviates from the context information by a predetermined degree but instead preferably by a degree for the deviation of the simulated or simulated and temporally delayed context information from the received context information. The degree of deviation is herewith used to adjust the simulation. This means that the simulation model is adapted as a function of the degree of deviation.

The degree of deviation is used in a further embodiment in order to adjust a time interval, with which the one or more units transmit the updated context information to the controller. Provision is made here to reduce a time interval, the greater the degree of the deviation. Correspondingly, provision is made to enlarge the time interval, the smaller the degree of deviation. The demand strategy of the controller is however adjusted to the degree of deviation of the simulated context information on the received context information. A strong deviation results in the frequency of the transmitted context information increasing so as to be better able to adjust the model of the simulation to the actual state. An automated self adjustment of the simulation of the controller is herewith effected.

In a further embodiment, one of the one or more units on the controller is temporally delayed in terms of context information to be transmitted, and is compared with the undelayed context information, with the transmission of the context information to the controller being triggered if the comparison of the undelayed and the delayed context information produces a deviation which extends beyond a predetermined degree. The unit sending the context information can herewith ensure that strong deviations in context information are detected. In this case, the unit transmits an item of updated context information even without a special request by the controller to the same.

The inventors propose a controller for the computer-assisted determination of a control value using context information from one or more units to be controlled. The controller is embodied so as to determine a simulated item of context information by simulation, with the simulated context information including a first variable which represents an assumed state of the one or more units at a given point in time. It is also embodied so as to compare and monitor a received item of context information, which includes a second variable, which represents the actual state of the unit to be controlled at a point in time which is before the given point in time, using the simulated context information so as to determine whether the simulated context information agrees with the context information within predetermined limits. The controller is further embodied so as to request an updated item of context information from the one and more units to be controlled, if the simulated context information outside the present limits agrees with the context information at a given point in time and to provide the simulated context information as control variables.

The same advantages result here in terms of how they were previously explained in conjunction with the method.

The controller is embodied in one embodiment so as not to request any updated context information from one or more units to be controlled if the simulated context information within the present limits corresponds with the context information at the given point in time.

According to a further embodiment, the controller is embodied so as to process the received context information as an input variable in order to determine the simulated context information.

A further expedient embodiment provides that the controller is embodied so as to temporally delay the simulated context information for the comparison with the context information.

The inventors also propose a regulating system comprising a controller and one or more units to be controlled, in which the controller is embodied as above. The same advantages are also associated herewith, as were already mentioned above.

The regulating system may be a communication network for instance. This may be embodied in particular in accordance with the IEEE 802.21 standard.

In a communication network of this type, the controller represents a unit in a network management system of the communication network. Contrary to this, the one or more units form a terminal of the communication network. The one or more units may also be an access computer of the communication network.

The inventors further propose a computer program product, which can be directly loaded into the internal memory of a digital computer, and has software code sections, with which the steps are executed in accordance with the previously described method if the product runs on a computer.

BRIEF DESCRIPTION OF THE DRAWING

These and other objects and advantages of the present invention will become more apparent and more readily appreciated from the following description of the preferred embodiments, taken in conjunction with the accompanying drawing of which:

The sole FIGURE shows a schematic representation of a proposed regulating system.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

As main components, the proposed control loop includes a controller 10, for instance a unit 20 to be controlled and a transmission path 30 arranged between the controller 10 and the unit 20 to be controlled. The controller 10 includes a context simulator 11 as a central element, the context simulator 11 including a model for the evaluation of context information to be evaluated. The context information is generated by way of example by a context source 21 of the unit 20 to be controlled and is fed to the context simulator 11 by way of the transmission path 30. The transmission path 30 can include a plurality of units and/or components transmitting the context information, so that an item of context information C1 sent at point in time t0 is only present at an entry of the context simulator 11 at point in time t1. The transmission path 30 is therefore represented by a responsible delay element 31 which is representative herefor.

The context simulator 11 determines an item of simulated context information SCI for point in time t1 from the context information received at point in time t1 and generated at point in time t0. In other words, this means that the context simulator determines the context information for a current point in time t1 from an item of context information originating from the past (t0).

To check whether the simulated context information SCI corresponds with the actual context information CI of the context source 21, this is fed to a delay unit 13, which delays the simulated context information SCI by a variable time t and is fed to a comparator 12. This contains the context information C1 as further input information. The comparator 21 determines a deviation degree of the simulated, delayed context information VSC1 from the context information C1.

If the degree exceeds a predetermined threshold, a control signal ST1 is output from the comparator 12 to the context simulator 11 on the one hand in order to adjust the model of the simulation in accordance with the degree of deviation. Furthermore, a control signal ST2 is transmitted to a unit 15 for requesting an updated item of context information. This emits a control signal ST3 to a unit 22 for conveying an updated item of context information, which transmits an updated item of context information via the transmission path 30 to the context simulator 11 upon receipt of the control signal ST3.

This means that the degree of deviation of the simulated, delayed context information VSC1 from the actual context information C1 can adjust the frequency of the transmission of context information (i.e. the time interval between two items of context information) from the unit 20 to be controlled to the controller 10. At the same time, the model of the simulation can also be adjusted to the benefits of the simulation.

The delay by the delay unit 13 is provided by a unit 13 for estimating the delay, which emits a control signal ST5 corresponding to the degree of the delay to the delay unit 13. To be able to determine the degree of the delay, the unit 14 obtains the context information C1 as an input signal. The delay 7 corresponds ideally to the difference of t1 and t0.

The unit 22 is responsible for the transmission of updated context information to the controller 10. This transmits updated context information usually in response to the request of the unit 15 of the controller 10. However, in order for the unit 20 to be controlled to be able to withstand sudden changes in the context information, the context information C1 is fed a delay unit 23, which delays this by a predetermined time span. The output signal of the delay unit 23 is fed to a comparator 24 together with the original context information C1.

If a significant deviation of the delayed context information VCI from the undelayed context information C1 is determined, a control signal ST4 is emitted by the comparator 24 to the unit 22, whereupon this transmits an updated item of context information to the controller 10 in response hereto.

An item of context information can represent a state of the unit 20 to be controlled for instance. In principle, context information is understood to mean any information which is generated by the unit 20.

The proposed method can be used for instance in a communication network, in particular in accordance with IEEE 802.21 standard. In particular, the proposed method allows a context-related network management. Network management generally includes the determination of relevant information from units of the network, like for instance network access computers or terminals, the interpretation of this information and the decision making and transmission of this decision to the relevant units of the communication network. This information can be optimized by using context information.

It is possible for instance to use context-related information for so-called handover processes, in which a terminal changes from one access computer to another access computer, if necessary using access technology. The controller processing the context information herewith obtains as context information e.g. a signal strength, delay, jitter, from the access computers and comes to a decision as to which available access technology is to be used by the terminal on a certain access computer. The context information can herewith likewise be used. The context information can likewise be used here to adjust multimedia services, which are utilized by a user, in response to an interface selected by the user.

The method also enables the monitoring of the data quantity, which is transmitted in the communication network. Measuring units, which are responsible for the monitoring of the data quantity, can be used here as data acquisition units. The measurements performed in this way can be transmitted to so-called collectors, which process the measurements for the purpose of fee determination. Such an exchange of information proceeds similarly to the exchange of context information so that an adjustment of the method to such measuring systems is possible.

In summary, the proposed method and devices have the following advantages:

The context simulator provides a solution for the problem of the time delay when transmitting context information, by an item of context information being determined at a given point in time of a unit to be controlled by simulation. The simulation allows a continual data update in short time intervals by the unit to be monitored to be dispensed with. Furthermore, the context simulator can be adjusted to changes in the context information flow, whereupon the results provided by the context simulator have a high reliability.

Providing a unit for requesting updated context information and a unit for conveying the updated context information ensures that the number of control messages exchanged in the regulating system is minimized. An available bandwidth can herewith be used optimally. The adjustment of a time period between two transmitted items of context information takes place as a function of the accuracy of the simulation. Furthermore, quick changes to the context information can be counteracted by the unit to be controlled. A quicker response time to the actually occurring changes is herewith enabled in the case of the units to be controlled.

Contrary to estimating the context information from a plurality of past context information in the related art, the proposed method uses a simulation in order to determine the value of the context information at a given point in time, with there being no need to transmit context information from the unit to be controlled at regular intervals. The number of items of exchanged information can herewith be reduced.

The unit for requesting an updated item of context information enables a quick response to changes in the context information of the unit to be controlled. Theoretically, the estimation or simulation of a context variable can herewith be improved by time intervals between two items of context information transmitted by the unit to be controlled being reduced for a certain period of time. This is then to occur if the simulated context information does not correspond with the actual context information beyond a predetermined degree. If the simulation proceeds correctly, the updating rate may by contrast be reduced (i.e. the time frame between two transmitted items of context information can be increased).

The unit for requesting an updated item of context information therewith enables an adaptation mechanism for the updating of the context information.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for computer-assisted determination of a control variable using context information from a unit to be controlled, comprising:
    determining simulated context information at a controller using a simulation, the simulated context information including a first variable which represents an assumed state of the unit to be controlled at a given point in time;
    using the simulated context information as a control variable;
    receiving actual context information including a second variable, which represents an actual state of the unit to be controlled at a point in time which is before the given point in time;
    comparing, at the controller, the actual context information with the simulated context information to determine whether the simulated context information corresponds with the actual context information within predetermined limits; and
    requesting updated context information from the unit to be controlled if the simulated context information is outside the predetermined limits with respect to the actual context information at the given point in time, the controller requesting the updated context information, wherein
    the controller repeatedly requests updated context information according to an update frequency, and
    the update frequency is decreased if the first and second variables match or increased if the first and second variables do not match.

2. The method as claimed in claim 1, wherein the controller does not request updated context information from the unit to be controlled, if the simulated context information corresponds within the predetermined limits to the actual context information at the given point in time.

3. The method as claimed in claim 1, wherein the actual context information is processed as an input variable in order to determine the simulated context information.

4. The method as claimed in claim 1, wherein the simulated context information is temporally delayed before comparing with the actual context information.

5. The method as claimed in claim 4, wherein simulated context information is temporally delayed with a delay set variably as a function of a time delay required to send the actual context information to the controller.

6. The method as claimed in claim 4, wherein the simulated context information is compared with the actual context information present at the controller at the current point in time.

7. The method as claimed in claim 1, wherein the controller determines the predetermined limits based on the degree of deviation of the simulated context information from the actual context information.

8. The method as claimed in claim 7, wherein the degree of the deviation is used to adjust the predetermined limits.

9. The method as claimed in claim 1, further comprising:
    temporally delaying the actual context information; and
    comparing delayed actual context information with undelayed actual context information and requesting updated context information if there is a deviation greater than a predetermined degree.

10. The method as claimed in claim 1, wherein wireless data transmission is used to receive actual context information and request updated context information.

11. A controller for computer-assisted determination of a control variable using context information from a unit to be controlled, comprising:
    a determination unit to determine simulated context information using a simulation, the simulated context information including a first variable which represents an assumed state of the unit to be controlled at a given point in time;
    a control unit to use the simulated context information as a control variable;
    a receiver to receive actual context information including a second variable, which represents an actual state of the unit to be controlled at a point in time which is before the given point in time;
    a comparator to compare the actual context information with the simulated context information to determine whether the simulated context information corresponds with the actual context information within predetermined limits; and
    a transmitter to transmit a request for updated context information to the unit to be controlled if the simulated context information is outside the predetermined limits with respect to the actual context information at the given point in time, wherein
    the transmitter repeatedly transmits requests for updated context information according to an update frequency, and
    the update frequency is decreased if the first and second variables match or increased if the first and second variables do not match.

12. The controller as claimed in claim 11, wherein the transmitter does not request updated context information if the simulated context information corresponds within the predetermined limits corresponds to the actual context information at the given point in time.

13. The controller as claimed in claim 11, wherein the actual context information is used as an input variable to determine the simulated context information.

14. The controller as claimed in claim 11, wherein the simulated context information is temporally delayed before comparison with the actual context information.

15. A regulating system comprising:
    the controller as claimed in claim 11; and
    the unit controlled by the controller.

16. The regulating system as claimed in claim 15, wherein the regulating system is an IEEE 802.21 communication network.

17. The regulating system as claimed in claim 16, wherein the controller is a network management system component.

18. The regulating system as claimed in claim 16, wherein the unit is a terminal of the communication network.

19. The regulating system as claimed in claim 16, wherein the unit is an access computer of the communication network.

20. The controller as claimed in claim 11, wherein
    the receiver is a wireless data receiver, and
    the transmitter is a wireless data transmitter.

21. A non-transitory computer readable storage medium storing a program for controlling a computer to perform a method for computer-assisted determination of a control variable using context information from a unit to be controlled, the method comprising:
    determining simulated context information using a simulation, the simulated context information including a first variable which represents an assumed state of the unit to be controlled at a given point in time;
    using the simulated context information as a control variable;
    receiving actual context information including a second variable, which represents an actual state of the unit to be controlled at a point in time which is before the given point in time;
    comparing the actual context information with the simulated context information to determine whether the simulated context information corresponds with the actual context information within predetermined limits; and
    requesting updated context information from the unit to be controlled if the simulated context information is outside the predetermined limits with respect to the actual context information at the given point in time, wherein
    updated context information is repeatedly requested according to an update frequency, and
    the update frequency is decreased if the first and second variables match or increased if the first and second variables do not match.

* * * * *

UNITED STATES PATENT AND TRADEMARK OFFICE
CERTIFICATE OF CORRECTION

| | | |
|---|---|---|
| PATENT NO. | : 8,819,250 B2 | Page 1 of 1 |
| APPLICATION NO. | : 12/733618 | |
| DATED | : August 26, 2014 | |
| INVENTOR(S) | : Sahin Albayrak et al. | |

It is certified that error appears in the above-identified patent and that said Letters Patent is hereby corrected as shown below:

On the Title Page, Item [54], and in the Specification, Column 1, Line 3 (Title), Delete "VARIABLE,CONTROLLER" and insert -- VARIABLE, CONTROLLER --, therefor.

In the Specification

Column 1, Line 7, Change "REFERENCE" to -- CROSS REFERENCE --.

Signed and Sealed this
Twenty-third Day of December, 2014

Michelle K. Lee
*Deputy Director of the United States Patent and Trademark Office*